United States Patent
Oikawa et al.

(10) Patent No.: US 10,899,904 B2
(45) Date of Patent: Jan. 26, 2021

(54) THERMOPLASTIC POLYURETHANE FOAMED PARTICLES AND METHOD FOR MANUFACTURING THERMOPLASTIC POLYURETHANE FOAMED PARTICLE MOLDED ARTICLE

(71) Applicant: JSP Corporation, Tokyo (JP)

(72) Inventors: Masaharu Oikawa, Tokyo (JP); Koki Nishijima, Utsunomiya (JP); Nobumasa Koshita, Tochigi (JP); Tatsuya Hayashi, Yokkaichi (JP)

(73) Assignee: JSP Corporation, Tokyo (JP)

( * ) Notice: Subject to any disclaimer, the term of this patent is extended or adjusted under 35 U.S.C. 154(b) by 158 days.

(21) Appl. No.: 16/088,746

(22) PCT Filed: Feb. 3, 2017

(86) PCT No.: PCT/JP2017/004082
§ 371 (c)(1),
(2) Date: Sep. 26, 2018

(87) PCT Pub. No.: WO2017/169116
PCT Pub. Date: Oct. 5, 2017

(65) Prior Publication Data
US 2019/0100640 A1    Apr. 4, 2019

(30) Foreign Application Priority Data
Mar. 31, 2016  (JP) ................. 2016-071881

(51) Int. Cl.
| | | |
|---|---|---|
| *C08J 9/236* | (2006.01) | |
| *C08J 9/224* | (2006.01) | |
| *C08J 9/18* | (2006.01) | |
| *B29C 44/34* | (2006.01) | |
| *C08J 9/232* | (2006.01) | |
| *B29C 44/02* | (2006.01) | |
| *B29C 44/44* | (2006.01) | |
| *C08J 9/20* | (2006.01) | |
| *B29K 75/00* | (2006.01) | |

(52) U.S. Cl.
CPC ............... *C08J 9/236* (2013.01); *B29C 44/02* (2013.01); *B29C 44/3426* (2013.01); *B29C 44/445* (2013.01); *C08J 9/18* (2013.01); *C08J 9/20* (2013.01); *C08J 9/224* (2013.01); *C08J 9/232* (2013.01); *B29K 2075/00* (2013.01); *C08J 2201/034* (2013.01); *C08J 2203/06* (2013.01); *C08J 2375/06* (2013.01); *C08J 2375/08* (2013.01)

(58) Field of Classification Search
CPC ..... B29C 44/00; B29C 44/02; B29C 44/3426; B29C 44/445; B29K 2075/00; C08G 18/48; C08J 2203/06; C08J 2375/06; C08J 2375/08; C08J 9/18; C08J 9/20; C08J 9/224; C08J 9/232; C08J 9/236; C08J 2201/034
See application file for complete search history.

(56) References Cited

U.S. PATENT DOCUMENTS

| | | | |
|---|---|---|---|
| 6,167,892 B1 | 1/2001 | Iwamoto et al. | |
| 2004/0109992 A1 | 6/2004 | Gribble et al. | |
| 2005/0153134 A1* | 7/2005 | Sasaki | C08J 9/18 |
| | | | 428/402 |
| 2007/0219281 A1* | 9/2007 | Ejiri | B01J 13/14 |
| | | | 521/56 |
| 2009/0197069 A1* | 8/2009 | Suzuki | C08F 293/005 |
| | | | 428/221 |
| 2012/0329892 A1 | 12/2012 | Prissok et al. | |
| 2013/0227861 A1 | 9/2013 | Prissok et al. | |

FOREIGN PATENT DOCUMENTS

| | | |
|---|---|---|
| CN | 1723312 A | 1/2006 |
| JP | S55-165928 A | 12/1980 |
| JP | H08-59875 A | 3/1996 |
| JP | H10-120819 A | 5/1998 |
| JP | 3358886 | * 12/2002 |
| JP | 2014062213 A | 4/2014 |
| JP | 5710930 B2 | 4/2015 |
| WO | 2006/046685 A1 | 5/2006 |

OTHER PUBLICATIONS

Extended European Search Report issued in corresponding EP Application No. 17773665.9 dated Oct. 7, 2019 (6 pages).
International Search Report for PCT/JP2017/004082 dated Apr. 25, 2017 and English Translation submitted herewith (5 pages).
Office Action issued in corresponding CN Application No. 201780020479.7 dated Sep. 10, 2020 (14 pages).

* cited by examiner

Primary Examiner — John M Cooney
(74) Attorney, Agent, or Firm — Fitch, Even, Tabin & Flannery LLP

(57) ABSTRACT

The present invention is concerned with expanded beads of thermoplastic polyurethane in which a water-soluble anionic surfactant is attached at 50 mg/m$^2$ to 1,000 mg/m$^2$ onto the surfaces of expanded beads of thermoplastic polyurethane having a dispersant attached thereto; and a method for producing an expanded beads molded article, including filling the expanded beads of thermoplastic polyurethane in a mold for molding and heating with a water vapor to mutually fuse the expanded beads with each other. The present invention provides expanded beads from which an expanded TPU beads molded article having excellent tensile strength and a method for producing an expanded TPU beads molded article.

3 Claims, No Drawings

=== PAGE 1 ===

THERMOPLASTIC POLYURETHANE FOAMED PARTICLES AND METHOD FOR MANUFACTURING THERMOPLASTIC POLYURETHANE FOAMED PARTICLE MOLDED ARTICLE

CROSS-REFERENCE TO RELATED APPLICATIONS

This application is a U.S. national phase application filed under 35 U.S.C. § 371 of International Application PCT/JP2017/004082, filed Feb. 3, 2017, designating the United States, which claims priority from Japanese Application Number 2016-071881, filed Mar. 31, 2016.

Field of the Invention

The present invention relates to expanded beads of thermoplastic polyurethane (hereinafter sometimes abbreviated as "TPU"), a method for producing an expanded thermoplastic polyurethane beads molded article using the expanded beads of thermoplastic polyurethane, and an expanded thermoplastic polyurethane beads molded article obtained by the foregoing production method.

Background of the Invention

Though TPU is one kind of thermoplastic elastomers, it exhibits characteristics close to those of vulcanized rubbers and is excellent in wear resistance, cold resistance, and repulsion elasticity. In addition, TPU is also high in mechanical strength, and therefore, TPU is positioned as an engineering elastomer and used for a variety of applications, such as cushioning materials, vibration-damping materials, sports goods, and automobile members.

An expanded molded article obtained through expansion of this TPU is able to contemplate lightness in weight or softening, while keeping excellent characteristics, such as wear resistance and repulsion elasticity, and hence, more application development of sports goods, automobile members, and so on is expected in the future. The expanded molded article of TPU can be produced by an extrusive expansion method, an in-mold molding method using expanded beads, or the like. In particular, expanded beads which are applicable for the in-mold molding method are recently required in view of the matter that expanded molded articles having a variety of shapes in conformity with a mold shape are obtained.

It is known that such expanded beads are produced by a method in which not only TPU-based resin beads are dispersed in an aqueous medium within a closed vessel, but also a blowing agent is introduced into the vessel, the blowing agent is impregnated in the resin beads under heating to form expandable resin beads, and the expandable resin beads in a softened state are then released under a low-pressure atmosphere (this method will be hereinafter also referred to as "dispersion medium releasing expansion method"). Furthermore, it is also known to produce an expanded TPU beads molded article by filling the expanded beads in a mold and heating with a water vapor or the like to mutually fuse the expanded beads with each other (see PTL 1).

However, though the expanded TPU beads are flexible, so that they are excellent in fusion bonding properties at the time of in-mold molding, there was involved such a problem that a molded article having desired physical properties, such as tensile strength, can not be obtained depending upon molding conditions.

PTL 1: US 2012/0329892 A

Summary of Invention

The present invention has been made for the purpose of solving the aforementioned problem and provides expanded beads from which an expanded TPU beads molded article having excellent tensile strength can be obtained and a method for producing an expanded TPU beads molded article.

In order to solve the aforementioned problem, the present inventors made extensive and intensive investigations. As a result, it has been found that it is the most effective measure to provide expanded beads of thermoplastic polyurethane in which a water-soluble anionic surfactant is attached at 50 mg/m$^2$ to 1,000 mg/m$^2$ onto the surfaces of expanded beads of thermoplastic polyurethane having a dispersant attached thereto, thereby leading to accomplishment of the invention of the present application.

Specifically, in accordance of the present invention, expanded beads of thermoplastic polyurethane, a method for producing an expanded thermoplastic polyurethane beads molded article, and an expanded thermoplastic polyurethane beads molded article produced by the foregoing production method, as shown in the following (1) to (6).

(1) Expanded beads of thermoplastic polyurethane in which a water-soluble anionic surfactant is attached at 50 mg/m$^2$ to 1,000 mg/m$^2$ onto the surfaces of expanded beads of thermoplastic polyurethane having a dispersant attached thereto.

(2) The expanded beads of thermoplastic polyurethane as set forth in the above (1), wherein the thermoplastic polyurethane that constitutes the expanded beads of thermoplastic polyurethane is an ether-based thermoplastic polyurethane.

(3) The expanded beads of thermoplastic polyurethane as set forth in the above (1) or (2), wherein the anionic surfactant is a polyacrylic acid salt.

(4) A method for producing an expanded thermoplastic polyurethane beads molded article, including filling expanded beads of thermoplastic polyurethane in a mold for molding and heating with a water vapor to mutually fuse the expanded beads with each other, wherein the expanded beads of thermoplastic polyurethane are ones obtained by attaching a water-soluble anionic surfactant in a range of from 50 mg/m$^2$ to 1,000 mg/m$^2$ onto the surfaces of expanded beads of thermoplastic polyurethane having a dispersant attached thereto.

(5) The method for producing an expanded thermoplastic polyurethane beads molded article as set forth in the above (4), wherein the thermoplastic polyurethane that constitutes the expanded beads of thermoplastic polyurethane is an ether-based thermoplastic polyurethane.

(6) An expanded thermoplastic polyurethane beads molded article obtained by the method for producing an expanded thermoplastic polyurethane beads molded article as set forth in the above (4) or (5).

DESCRIPTION OF EMBODIMENTS

The expanded beads of thermoplastic polyurethane, the method for producing an expanded thermoplastic polyurethane beads molded article using the expanded beads of thermoplastic polyurethane, and an expanded thermoplastic polyurethane beads molded article obtained by the foregoing production method according to the present invention are hereunder successively described in detail.

In the expanded beads of thermoplastic polyurethane of the present invention, a water-soluble anionic surfactant is attached at 50 mg/m$^2$ to 1,000 mg/m$^2$ onto the surfaces of expanded beads of thermoplastic polyurethane having a dispersant attached thereto.

Thermoplastic Polyurethane (TPU)

The TPU that constitutes the expanded beads of the present invention has a structure in which a soft segment having a long-chain polyol and a diisocyanate polymerized therein via a urethane bond and a hard segment having a short-chain glycol and a diisocyanate polymerized therein via a urethane bond are mutually bonded to each other. In addition, principally, the soft segment reveals stretchability, and the urethane bonding part produces a firm hydrogen bond. The hardness of the TPU can be adjusted by a ratio of the soft segment and the hard segment without requiring an additive, such as a plasticizer.

The TPU mainly includes an ester-based type and an ether-based type, and in particular, a long-chain polyol type largely influences the characteristics of the obtained TPU. In general, the ester-based TPU is excellent especially in mechanical strength, heat resistance, and so on. Meanwhile, the ether-based TPU is excellent especially in cold resistance, hydrolysis resistance, fungus resistance, and so on.

Examples of the long-chain polyol in the ester-based TPU include compounds obtained through a condensation reaction between a polyhydric alcohol, such as ethylene glycol, propylene glycol, butanediol, butenediol, hexanediol, pentanediol, neopentyldiol, and pentanediol, and a dibasic acid, such as adipic acid, sebacic acid, azelaic acid, terephthalic acid, isophthalic acid, maleic acid, and an aromatic carboxylic acid; and lactone-based ester polyols. Meanwhile, examples of the long-chain polyol in the ether-based TPU include polyethylene ether glycol, polypropylene ether glycol, polytetramethylene ether glycol, and polyhexamethylene ether glycol.

A constitutional element of the aforementioned TPU is not particularly limited. The constitutional element of the aforementioned TPU can be properly selected according to physical properties required for the resulting expanded TPU beads molded article. Though all of the aforementioned ether-based TPU and ester-based TPU are usable, in the present invention, the ether-based TPU is preferred from the viewpoint that in the molded article, the tensile strength can be more highly improved.

The ether-based TPU has such a tendency that a dispersant is readily attached, as compared with the ester-based TPU. Accordingly, in the expanded beads using the ether-based TPU, the attachment amount of the dispersant becomes readily large, as compared with the case of using expanded beads of the ester-based TPU. Thus, it may be considered that the dispersant is detached together with the water-soluble anionic surfactant with a water vapor or the like at the time of molding, whereby an effect for improving the tensile strength becomes larger.

The expanded beads of the present invention are constituted of the aforementioned TPU. However, other polymer, such as a polyolefin, a styrene-based elastomer, and a styrene-based resin, can also be mixed with the aforementioned TPU and used according to the application and object of the expanded beads molded article within a range where the object of the present invention is not impaired. The use amount of such other polymer is preferably 30 parts by mass or less, more preferably 20 parts by mass or less, and still more preferably 10 parts by mass or less based on 100 parts by mass of the TPU.

In the TPU that constitutes the aforementioned expanded beads, its softening temperature is preferably 110 to 160° C. When the softening temperature of the TPU falls within the aforementioned range, expanded beads that are excellent in moldability and fusion bonding properties are provided. From the aforementioned viewpoint, the softening temperature is more preferably 115 to 160° C.

In the TPU that constitutes the expanded beads, a melt flow rate (MFR) at 190° C. under a load of 10 kg is preferably 60 g/10 min or less. When the MFR falls within the aforementioned range, unification of the cells is hardly generated at the time of expansion, and good expanded beads are provided without causing fracture of cell films. The MFR is preferably 1 to 50 g/10 min, and more preferably 5 to 40 g/10 min.

Expanded Beads

From the viewpoint of lightness in weight, an apparent density of the expanded TPU beads is preferably 0.3 g/cm$^3$ or less. Even if the apparent density of the expanded beads is 0.3 g/cm$^3$ or less, the expanded beads of the present invention not only have excellent secondary expandability but also are excellent in moldability. The apparent density is more preferably 0.02 to 0.25 g/cm$^3$, and still more preferably 0.03 to 0.2 g/cm$^3$.

Production Method of Expanded TPU Beads

Though the expanded TPU beads of the present invention are not particularly limited with respect to the production method thereof, it is preferred to obtain them by a production method including a step (1) of dispersing TPU resin beads in a dispersion medium within a closed vessel and impregnating a blowing agent in the resin beads under heating, to form expandable resin beads; and a step (2) of releasing the expandable resin beads from the closed vessel under a low pressure at a temperature that is lower by 30° C. than the softening temperature of the TPU or higher [{(softening temperature of the TPU resin beads)–30}° C. or higher] and expanding them, thereby obtaining expanded TPU beads.

Such a production method of expanded beads is called a direct expansion method, in which the blowing agent is impregnated in the resin beads in the dispersion medium under a high pressure at a relatively high temperature, thereby obtaining the expandable resin beads, and the expandable resin beads are then released as they are under a low pressure together with the dispersion medium, thereby obtaining the expanded beads.

<Step (1)>

First of all, in the aforementioned step (1), TPU resin beads are dispersed in a dispersion medium within a closed vessel, and a blowing agent is impregnated in the resin beads under heating, thereby obtaining expandable resin beads.

In this way, the blowing agent is introduced into the closed vessel, and the resin beads are heated in a state of being dispersed in the dispersion medium, whereby the inside of the closed vessel becomes a high-temperature high-pressure atmosphere. There are thus obtained the expandable resin beads having the blowing agent impregnated in the softened resin beads.

Though an average mass of one TPU resin bead is properly selected according to the size or expansion ratio of the target expanded TPU bead, it is preferably 0.5 to 30 mg, and more preferably 1 to 20 mg. When the average mass falls within the aforementioned range, the filling properties in a mold for expansion molding are improved, and expanded beads having excellent moldability are provided.

The TPU resin beads are not particularly limited with respect to the production method thereof but can be obtained by a known method. For example, the TPU resin beads are obtained by extruding a resin melt into a strand-like form from small holes of a nozzle annexed in a tip of an extruder and then cutting the extruded resin melt by a pelletizer such that the resin melt has a predetermined mass. In addition, the TPU resin beads can also be obtained by the underwater cutting method in which the molten TPU resin is extruded from the extruder and cut in water.

The TPU resin beads can be properly blended with various additives which are usually used, such as a cell adjusting agent, an antistatic agent, an electrical conductivity imparting agent, a lubricant, an antioxidant, an ultraviolet ray absorbing agent, a flame retardant, a metal-deactivator, a pigment, a dye, a crystal nucleus agent, and a filler, as the need arises. Examples of the cell adjusting agent include inorganic materials, such as talc, sodium chloride, calcium carbonate, silica, titanium oxide, gypsum, zeolite, borax, aluminum hydroxide, and carbon, as well as a phosphate-based nucleus agent, a phenol-based nucleus agent, an amine-based nucleus agent, and an organic nucleus agent, such as polytetrafluoroethylene (PTFE). Though the addition amount of such an additive of every kind varies with the application purpose of the expanded beads molded article, it is preferably 25 parts by mass or less, more preferably 15 parts by mass or less, still more preferably 10 parts by mass or less, and especially preferably 5 parts by mass or less based on 100 parts by mass of the aforementioned TPU.

The TPU resin beads are dispersed in an aqueous medium (typically water) that is a dispersion medium in a pressurizable closed vessel, such as an autoclave.

In the dispersion medium, a dispersant, such as a sparingly water-soluble inorganic material, e.g., kaolin, aluminum oxide, tribasic calcium phosphate, magnesium pyrophosphate, zinc oxide, mica, and talc, is used such that the resin beads are uniformly dispersed in the dispersion medium. Among those, kaolin is preferably used. In addition, it is preferred to disperse a dispersant aid, such as sodium dodecylbenzenesulfonate and a sodium alkanesulfonate. In addition, an average bead diameter of the dispersant is typically 0.001 to 100 μm, and in particular, the dispersant having an average bead diameter of 0.001 to 30 μm is preferably used. As the average bead diameter, a value which is calculated with the bead diameter and number from the particle size distribution obtained on the number basis by a centrifugal sedimentation type particle size distribution analyzer is adopted.

The attachment amount of the dispersant to the expanded TPU beads is typically about 100 to 10,000 ppm by mass. In the case where the expanded beads are washed with water or an acidic aqueous solution, the attachment amount of the dispersant to the expanded TPU beads can be controlled to approximately 0 ppm by mass. However, there is a concern that the tensile strength of the molded article becomes insufficient depending upon an application, or there is a concern that the molded article is yellowed depending upon the kind of TPU and strength of the acid.

Meanwhile, in the case of molding the expanded TPU beads in a state that the dispersant is attached as it is, the expanded TPU beads are flexible, and therefore, even when the dispersant is attached, the fusion bonding properties of the molded article is kept. However, there is a concern that the molded article is poor in the tensile strength depending upon molding conditions. In the present invention, even if the dispersant is attached in an amount of about 100 to 10,000 ppm by mass on the surfaces of the expanded beads, by further coating a water-soluble anionic surfactant thereon, it is possible to provide expanded beads exhibiting sufficient fusion bonding properties and capable of providing a molded article having excellent tensile strength.

The aforementioned attachment amount of the dispersant can be determined through fluorescent X-ray analysis. For example, in the case of using kaolin as the dispersant, the attachment amount of kaolin is determined in a manner of preparing a sample having a diameter of 40.0 mm and a thickness of 4.0 mm from expandable resin beads, expanded beads, or an expanded beads molded article by means of heat press, measuring the amount of an oxide of aluminum using a fluorescent X-ray analyzer "Supermini", manufactured by Rigaku Corporation, and then substituting the analyzed value for a calibration formula determined from a calibration curve. In the case of preparing a measurement sample from the expandable resin beads, expanded beads, or expanded beads molded article, a cell-free sample must be used through thorough defoaming.

The aforementioned calibration curve can be prepared from values obtained by controlling the kaolin amount of the TPU resin beads before dispersing in the dispersion medium within a closed vessel to 0% by mass and then preparing a sample having 0.1% by mass of kaolin added therein and a sample having 1.0% by mass of kaolin added therein, respectively, followed by performing fluorescent X-ray measurement. In addition, in the case of using tribasic calcium phosphate as the dispersant, the attachment amount of tribasic calcium phosphate can be determined by subjecting phosphorus oxide to fluorescent X-ray measurement in the aforementioned method.

It is preferred to use carbon dioxide as the blowing agent. By using carbon dioxide, it becomes possible to prevent refinement of cells at the time of expansion from occurring, and the expanded beads can be readily obtained by the direct expansion method. In addition, among the inorganic blowing agents, carbon dioxide is excellent in compatibility with the TPU, and the carbon dioxide can be uniformly impregnated in the TPU resin beads with good efficiency. Furthermore, when carbon dioxide is used as the blowing agent, an explosion-proof countermeasure is not required, it is easy to secure safety, and the equipment investment costs can be reduced.

As the blowing agent, other physical blowing agent or chemical blowing agent can also be used in combination.

As other physical blowing agent, examples of an organic physical blowing agent include aliphatic hydrocarbons, such as propane, butane, hexane, pentane, and heptane; alicyclic hydrocarbons, such as cyclobutane and cyclohexane; halogenated hydrocarbons, such as chlorofluoromethane, trifluoromethane, 1,1-difluoroethane, 1,1,1,2-tetrafluoroethane, methyl chloride, ethyl chloride, and methylene chloride; and dialkyl ethers, such as dimethyl ether, diethyl ether, and methyl ethyl ether. In addition, examples of an inorganic physical blowing agent include nitrogen, argon, air, and water.

The use amount of the blowing agent is properly determined while taking into account the apparent density of the target expanded bead, the kind of the TPU, or the like. Typically, the use amount of the blowing agent is preferably 0.5 to 30 parts by mass based on 100 parts by mass of the resin beads. In addition, a blending ratio of carbon dioxide in the blowing agent is preferably 50% by mass or more, more preferably 70% by mass or more, and still more preferably 90% by mass or more.

On the occasion of impregnating the blowing agent in the TPU resin beads, from the viewpoint of thoroughly impregnating the blowing agent in the TPU resin beads for a short time, the impregnation is performed under heating, and it is preferred to perform the heating at {(softening temperature of the TPU resin beads)−30}° C. or higher.

The pressure (impregnation pressure) within the aforementioned closed vessel is preferably 0.5 to 10 MPa(G) [(G) expresses a gauge pressure], more preferably 1 to 8 MPa(G), and still more preferably 2 to 5 MPa(G). When the pressure falls within the aforementioned range, the blowing agent can be thoroughly impregnated in the TPU resin beads, and the pressure resistance of the closed vessel is relatively easily secured.

A time for heating (impregnation time) is properly set according to the pressure within the closed vessel, the kind or mass of the TPU resin bead, or the like. From the viewpoint of productivity, the time for heating is preferably 0.05 to 3 hours, and more preferably 0.1 to 1 hour.

In the foregoing way, the blowing agent is impregnated in the TPU resin beads, whereby the expandable resin beads are formed.

<Step (2)>

Next, in the step (2), it is preferred that the expandable resin beads are released under a low pressure at {(softening temperature of the TPU)−30}° C. or higher and expanded, thereby obtaining expanded TPU beads.

On the occasion of releasing the expandable resin beads under a low pressure, the temperature (expansion temperature) within the closed vessel is set to {(softening temperature of the TPU)−30}° C. or higher. By performing the expansion in such a temperature range, expanded beads having a high expansion ratio and a low apparent density can be readily obtainable.

From the aforementioned viewpoint, the expansion temperature is more preferably from {(softening temperature of the TPU resin beads)−28}° C. to {(softening temperature of the TPU resin beads)−2}° C., still more preferably from {(softening temperature of the TPU resin beads)−27}° C. to {(softening temperature of the TPU resin beads)−5}° C., and especially preferably from {(softening temperature of the TPU resin beads)−25}° C. to {(softening temperature of the TPU resin beads)−10}° C.

On the occasion of releasing the expandable resin beads from the closed vessel, in order to minimize scattering in the apparent density or cell diameter of the resulting expanded beads, it is preferred to keep the temperature and pressure within the opened vessel at fixed levels or to increase them step-by-step by applying a back pressure with carbon dioxide, air, or the like.

The expanded TPU beads are liable to cause shrinkage especially when expanded at a high expansion ratio. This shrinkage is caused due to the matter that the inside of the cell becomes in a reduced pressure state when the high-temperature gas existent in the cell of the expanded bead is cooled or dissipated outside the expanded bead. In such a case, it is preferred that the expanded beads after being aged under atmospheric pressure are subjected to a pressurization treatment with air to render them in a stable state, followed by performing aging. Specifically, the resulting expanded beads are put into a closed vessel, aged by allowing to stand under atmospheric pressure at 40° C. for 24 hours, and then subjected to a pressurization treatment with compressed air of 0.3 MPa at 30° C. for 12 hours, whereby the expanded beads can be made in a stable state.

In the case where it is contemplated to make the expansion ratio of the expanded beads as obtained above higher, two-stage expansion may be performed, as the need arises. For example, expanded beads having a lower apparent density can be obtained under heating of the expanded beads by using steam, heated air, or the like in a high-pressure atmosphere, or other means.

In the present invention, since the dispersant is attached to the resulting expanded beads, in order to lower any influence of the dispersant at the time of in-mold molding and to enhance fusion bonding properties among the expanded beads, thereby improving tensile physical properties of the molded article, a water-soluble anionic surfactant is attached. Accordingly, in the expanded beads of the present invention, the water-soluble anionic surfactant is attached onto the surfaces of the expanded beads having the dispersant attached thereto.

Examples of the attachment of the water-soluble anionic surfactant onto the surfaces of the expanded beads in the present invention include a method of mixing the expanded beads and the water-soluble anionic surfactant by a mixing machine; a method of mixing the expanded beads and the water-soluble anionic surfactant by an extrusion-type coating device equipped with a screw; and a method of putting the water-soluble anionic surfactant into a pipe for pneumatic transport within a pipe on the way of pneumatic transport of the expanded beads having the dispersant attached thereto into a storage tank. The surfactant has only to exist on the surfaces of the expanded beads, and the surfaces of the expanded beads are not always required to be completely covered by the surfactant. Though an embodiment in which a portion where the surfaces of the expanded beads are not covered by the surfactant is included is inclusive, an embodiment in which the surfaces of the expanded beads are completely covered by the surfactant is more preferred. The step of attaching the water-soluble anionic surfactant onto the surfaces of the expanded beads may be performed at any stage of immediately after expansion, after the aforementioned aging under atmospheric pressure, and after performing aging by the pressurization treatment.

Examples of the water-soluble anionic surfactant which is used in the present invention include carboxylic acid-type, sulfonic acid-type, sulfate-type, phosphate-type, and polymer-type water-soluble anionic surfactants.

Examples of the carboxylic acid-type surfactant include aliphatic monocarboxylic acid salts, polyoxyethylene alkyl ether carboxylic acid salts, N-acyl sarcosine salts, and N-acyl glutamic acid salts.

Examples of the aliphatic monocarboxylic acid salt include sodium and potassium salts of lauric acid, myristic acid, pentadecanoic acid, palmitic acid, margaric acid, stearic acid, tuberculostearic acid, arachidic acid, behenic acid, lignoceric acid, cerotic acid, montanic acid, palmitoyl acid, oleic acid, maleic acid, vaccenic acid, linoleic acid, linolenic acid, eleostearic acid, arachidonic acid, erucic acid, and nervonic acid. Examples of the polyoxyethylene alkyl ether carboxylic acid salt include sodium and potassium salts of polyoxyethylene lauryl ether carboxylic acid. Examples of N-acyl sarcosine salt include an oleoyl sarcosine sodium salt. Examples of the N-acyl glutamic acid salt include an oleoyl glutamine sodium salt.

Examples of the sulfonic acid-type surfactant include dialkylsulfosuccinic acid salts, alkanesulfonic acid salts, α-olefin sulfonic acid salts, alkylbenzenesulfonic acid salts, alkylnaphthalenesulfonic acid salts, formaldehyde condensate alkylnaphthalenesulfonic acid salts, alkyldiphenyl ether disulfonic acid salts, and polyoxyethylene alkylphenylsulfonic acid salts. As the dialkylsulfosuccinic acid salts, sodium dioctylsulfosuccinate is preferred. As the alkanesulfonic acid salt, sodium oleylsulfonate is preferred. As the alkylbenzenesulfonic acid salt, sodium dodecylbenzenesulfonate is preferred. As the alkylnaphthalenesulfonic acid salt, sodium dodecylnaphthalenesulfonate is preferred. As the formaldehyde condensate alkylnaphthalenesulfonic acid salt, sodium formaldehyde condensate dodecylnaphthalenesulfonate is preferred. As the alkyldiphenyl ether disulfonic acid salt, sodium lauryl diphenyl ether disulfonate is preferred.

Examples of the sulfate-type surfactant include alkyl sulfate ether salts, alcohol ethoxy sulfates, oil and fat sulfate ester salts, and polyoxyethylene alkyl ether sulfate ester salts.

Examples of the phosphate-type surfactant include alkyl ether phosphoric acid salts, polyoxyethylene alkyl ether phosphoric acid salts, and polyoxyethylene alkylphenyl ether phosphoric acid salts. Examples of the alkyl ether phosphoric acid salt include disodium lauryl ether phosphate. Examples of the polyoxyethylene alkyl ether phosphoric acid salt include disodium polyoxyethylene lauryl ether phosphate. Examples of the polyoxyethylene alkylphenyl ether phosphoric acid salt include disodium polyoxyethylene laurylphenyl ether phosphate.

Examples of the polymer-type surfactant include polycarboxylic acid salts, polyaliginic acid salts, polyacrylic acid salts, salts of polyalkyl acrylate copolymers, polymethacrylic acid salts, salts of polyalkyl methacrylate copolymers, salts of olefin maleic acid copolymers, salts of polyacrylic acid maleic acid copolymers, and salts of polyacrylic acid sulfonic acid copolymers.

Among the aforementioned anionic surfactants, in view of the fact that expanded beads from which an expanded beads molded article having excellent tensile strength is provided is obtained, it is preferred to attach a polyacrylic acid salt, an alkanesulfonic acid salt, or a polyacrylic acid sulfonic acid copolymer salt onto the surfaces of the expanded beads. Of those, a polyacrylic acid salt is especially preferred. Specifically, sodium polyacrylate is preferably exemplified.

In the present invention, the anionic surfactant can be used either alone or in admixture of two or more thereof.

Furthermore, the anionic surfactant is required to be a water-soluble anionic surfactant exhibiting a solubility of 5% by mass or more in water at 25° C. When the water-soluble anionic surfactant is used, an effect for washing the dispersant is large even if the time is short at the time of in-mold molding, or the amount of steam is small, and it is possible to provide a TPU molded article having excellent tensile strength. The wording "water-soluble" as referred to in the present invention means that 5% by mass or more of the surfactant is dissolved in water at 25° C.

A molecular weight of the anionic surfactant is preferably 200 to 200,000, more preferably 300 to 50,000, and still more preferably 300 to 6,000.

Among the anionic surfactants, in the case of a polymer-type surfactant, its number average molecular weight is preferably 2,000 to 200,000, more preferably 3,000 to 50,000, and still more preferably 3,000 to 6,000. When the molecular weight falls within the aforementioned range, the aforementioned washing ability is strengthened, and the effect for improving the tensile strength is enhanced. In addition, from the viewpoint of an improvement in the solubility in water or an aptitude of the viscosity of the aqueous solution, the resultant is readily handled on an industrial scale.

In the present specification, though the molecular weight of the water-soluble anionic surfactant is a value determined through calculation from the atomic weight on the basis of a molecular formula, the number average molecular weight of the polymer-type surfactant is a value as expressed in terms of polyethylene glycol by means of the GPC measurement.

The attachment amount of the water-soluble anionic surfactant per surface area of the expanded bead is 50 mg/m$^2$ or more, preferably 100 mg/m$^2$ or more, and especially preferably 200 mg/m$^2$ or more. Meanwhile, an upper limit of the attachment amount per surface area is 1,000 mg/m$^2$ or less, and preferably 800 mg/m$^2$ or less. When the foregoing attachment amount falls within the aforementioned range, the desired effect for improving the tensile strength becomes much more noticeable.

In the present specification, as the attachment amount of the water-soluble anionic surfactant to the expanded bead, a value calculated on the basis of a value measured using a total organic carbon (TOC) analyzer is adopted.

The measurement of TOC can be performed using a Shimadzu's total organic carbon analyzer, TOC-V$_{CSH}$ by means of the TC-IC method. Specifically, the measurement is performed in the following manner.

(1) The calibration of an instrument is performed with 0 to 20 mgC/L of a potassium hydrogen phthalate aqueous solution for TC (total carbon content measurement) and performed with 0 to 20 mgC/L of a 1/1 (molar ratio) mixed solution of sodium carbonate/sodium hydrogen carbonate for IC (inorganic carbon content measurement), respectively.

(2) Subsequently, an aqueous solution obtained by diluting a commercially available surfactant having an already-known concentration 10,000 to 20,000 times is prepared.

(3) The TC value and the IC value of the surfactant-diluted aqueous solution are measured, a value obtained by subtracting the IC value from the TC value is defined as the TOC value, and then a calibration curve is prepared from the TOC value and the concentration of the surfactant of every kind.

(4) About 10 g of expanded beads covered by the surfactant and 100 mL of pure water are enclosed in a hermetically sealable glass container under conditions at room temperature (25° C.), which is then shaken in a hermetically sealed state for one minute, and the surfactant is then extracted into pure water.

Subsequently, the extract is filtered with a glass filter paper, and its TOC value is measured. A concentration of the surfactant is calculated from the TOC value of the extract on the basis of the calibration curve prepared from the surfactant-diluted solution having an already-known concentration, and the attachment amount (mg) of the surfactant per expanded bead is calculated on the basis of the foregoing concentration, the amount of the surfactant extract, and the number of expanded beads constituting about 10 g of the group of expanded beads. Subsequently, the attachment amount (mg) of the surfactant per expanded bead is divided by a surface area (m$^2$) per expanded bead as determined by the following method, thereby determining an attachment amount (mg/m$^2$) of surfactant per unit surface area of the expanded bead.

For the calculation of the surface area per expanded bead, the weight of 500 or more expanded beads which have been allowed to stand under conditions at a relative humidity of 50% and 23° C. under 1 atm for 2 days is first precisely weighed (weight W1 of the group of expanded beads). Subsequently, a graduated cylinder charged with ethanol at 23° C. is prepared, the aforementioned group of expanded beads is sunk by using a wire net or the like, and then a volume of the group of expanded beads to be read from a rise of the ethanol level is then measured. A volume V1 per expanded bead is determined by dividing the volume of the foregoing group of expanded beads by the number of expanded beads that constitute the group of expanded beads. Subsequently, on the assumption that the expanded bead is a true sphere, a value S1 determined by leading a radius R1 (m) corresponding to the true sphere of the group of expanded bead from a volume formula of sphere (V1=4πR1³/3) and the volume V1 and substituting the radius R1 (m) corresponding to the true sphere for a surface area formula of sphere (S1=4πR1²) is defined as a surface area (m²) per expanded bead. As for the attachment amount of the water-soluble anionic surfactant to the expanded beads in each of the Examples and Comparative Examples of the present invention, the obtained numerical value is written as it is. In addition, in this measurement method, even in the case of expanded beads to which the water-soluble anionic surfactant had not been attached, the attachment amount was calculated; however, it may be considered that this was possibly caused due to an influence of a low-molecular weight material generated upon hydrolysis of polyurethane-based expanded beads.

Expanded Beads Molded Article

The expanded beads molded article obtained by subjecting the expanded TPU beads of the present invention to in-mold molding has excellent characteristics as mentioned later.

In the expanded TPU beads molded article of the present invention, from the viewpoint that characteristics, such as tensile strength and lightness in weight, are sufficiently exhibited, its density is preferably 0.05 to 0.4 g/cm³, more preferably 0.1 to 0.3 g/cm³, and still more preferably 0.15 to 0.25 g/cm³.

The expanded beads having the water-soluble anionic surfactant attached thereto are not ones from which the dispersant has been positively washed and removed, but they are filled in a state that a considerable amount of the dispersant is attached as it is in a mold for molding. After the expanded beads are filled in the mold for molding, the dispersant is removed with a water vapor or the like together with the water-soluble anionic surfactant at the time of molding, whereby a molded article having excellent tensile strength can be provided. The tensile strength of the aforementioned expanded TPU beads molded article is preferably 1.0 MPa or more, more preferably 1.2 MPa or more, and still more preferably 1.4 MPa or more.

As for the measurement method of the tensile strength of the expanded beads molded article, the tensile strength can be determined by preparing a sample of a dumbbell No. 1 type shape as prescribed in JIS K6251 (2010) and performing the measurement in conformity with the measurement method of tensile elongation of JIS K6767 (1999).

The reason why the tensile strength of the expanded beads molded article having the anionic surfactant attached thereto is improved is not elucidated yet. However, the matter that the dispersant is washed away together with the anionic surfactant by condensed water derived from a water vapor to be introduced at the time of in-mold molding, whereby the tensile strength of the expanded beads molded article is improved may be considered to be a first reason. In addition, the matter that a minus charge of the anionic surfactant and a minus charge of the dispersant which has become negatively charged repel each other, so that the dispersant is readily washed away may also be conjectured to be a second reason. From the aforementioned reasons, it may be considered that the dispersant is effectively removed together with the anionic surfactant existent on the surfaces of the expanded beads, and the contact area of the expanded beads with each other becomes large, and as result, an expanded beads molded article having excellent tensile strength is obtained.

The in-mold molding method for obtaining the expanded TPU beads molded article of the present invention is not particularly limited, and a molded article having a desired form can be obtained by a known method.

For example, the following methods are exemplified.

First of all, the expanded beads having an anionic surfactant attached thereto are filled in a known mold cavity for in-mold molding of expanded thermoplastic resin beads, which is possible for heating and cooling and is able to be opened or closed and hermetically sealed. Then, a saturated water vapor is fed, and the expanded beads are heat swollen within the mold cavity to mutually fuse the expanded beads with each other, thereby forming an expanded beads molded article. Subsequently, by adopting a batch-type in-mold molding method (see, for example, JP 4-46217 B and JP 6-49795 B), in which this expanded beads molded article is cooled and then taken out from the mold cavity, the expanded TPU beads molded article can be produced.

The expanded TPU beads have high responsibility against heat, and therefore, there is a concern that if the molding pressure at the time of in-mold molding is made too high, the expanded beads molded article is melted or shrunk. From the aforementioned viewpoint, a saturated vapor pressure to be fed into the mold cavity is preferably 0.05 to 0.48 MPa(G) (maximum value of the saturated vapor pressure of the water vapor to be fed into the mold), and more preferably 0.08 to 0.42 MPa(G).

The expanded TPU beads molded article can also be produced by a continuous molding method (see, for example, JP 9-104026 A, JP 9-104027 A, and JP 10-180888 A).

As a method of filling the expanded beads in a mold for molding, such as a mold cavity, a known method can be adopted. For example, a compression filling method or a cracking filling method can also be adopted. Similar to the operation in the aforementioned two-stage expansion, after adjusting the pressure within the expanded bead to 0.1 to 1.0 MPa(G) in a high-pressure atmosphere, those expanded beads may be filled in the mold and molded.

As for the heating with a saturated water vapor in the in-mold molding method, heating methods, such as one-direction flow heating, reversed one-direction flow heating, and main heating, can be properly combined according to a known method. In particular, a method of heating the expanded beads in the order of preheating, one-direction flow heating, reversed one-direction flow heating, and main heating is preferred.

The one-direction flow heating means feeding a heating medium to the inner portion of either a male mold or a female mold to heat the expanded beads within the cavity, followed by ejecting the heating medium from the inner portion of the other female mold or male mold. In addition, the case where the mold to which the heating medium is fed and the mold from which the heating medium is ejected are opposite to those of the case of the aforementioned one-direction flow heating refers to the reversed one-direction flow heating.

As described above in detail, the present invention is able to provide expanded beads of thermoplastic polyurethane from which an expanded thermoplastic polyurethane beads molded article having excellent tensile strength can be produced.

EXAMPLES

The present invention is hereunder described in more detail by reference to Examples, but it should be construed that the present invention is by no means limited thereto.

Evaluations and Measurement Methods

Various physical properties of raw material resin beads, expanded beads, and expanded beads molded articles in the following Examples and Comparative Examples are those determined by the following evaluations and measurements.

With respect to the expanded beads molded articles, the measured values of the following (5) to (6) are values measured regarding a sample obtained by aging the resulting expanded beads molded article under atmospheric pressure at 40° C. for 24 hours and then allowing the molded article to stand for aging in a thermostat chamber at a relative humidity of 50% and 23° C. for 10 days.

(1) Softening Temperature

The softening temperature was measured by means of TMA (Thermo-Mechanical Analyzer). TMA7100, manufactured by Hitachi High-Tech Science Corporation was used, and a probe of 1.0 mm was used as a penetration probe. When this probe was used and applied with a load of 98 mN, and then pushed against a sample having a thickness of 2 mm, and when the temperature was raised (temperature rise rate=5° C./min) in a measurement temperature range of from 30 to 250° C., a penetration depth (amount of displacement) of the probe was monitored. A temperature at which the amount of displacement abruptly changed was extrapolated to determine the softening temperature.

(2) Attachment Amount of Dispersant

The attachment amount of the dispersant was determined by preparing a sample having a diameter of 40.0 mm and a thickness of 4.0 mm from expanded beads and an expanded beads molded article, respectively by means of heat press, measuring the amount of an oxide of aluminum using a fluorescent X-ray analyzer "Supermini", manufactured by Rigaku Corporation, and substituting the analyzed value for a calibration formula determined from a calibration curve. The aforementioned operation was performed three times, and an arithmetic mean value of the obtained values was defined as the attachment amount of dispersant.

(3) Apparent Density of Expanded Beads

In a graduated cylinder charged with water at 23° C., about 500 mL of expanded beads W1 (g) were sunk using a wire net. A volume V1 (cm$^3$) of the group of expanded beads was determined from the water level rise while taking into account the volume of the wire net. Then, the mass $W_1$ (g) of the expanded beads charged in the graduated cylinder was divided by the volume $V_1$ ($W_1/V_1$), to determine the apparent density (g/cm$^3$) of the expanded beads.

(4) Evaluation of Solubility in Water of Anionic Surfactant

As for the evaluation of solubility in water of the anionic surfactant, 50 g of the surfactant was charged in a 2,000-mL glass container, diluted with 950 g of water at 25° C., and then thoroughly stirred. Then, the solubility in water of the anionic surfactant was judged through visual inspection.

(5) Density of Molded Article

A value obtained by dividing a mass of the expanded beads molded article by a volume determined from the outside dimension of the expanded beads molded article was determined and subjected to unit conversion.

(6) Degree of Fusion Bonding

A sample of 170 mm in length×30 mm in width×33 mm in thickness was cut out from an expanded beads molded article which was molded in a mold cavity of 200 mm in length×60 mm in width×33 mm in thickness. One of the surfaces of this sample was incised with a cutter knife in a depth of about 15 mm so as to bisect the length of the molded article, and the molded article was bent from the incised part and fractured. A value of a ratio (m/n) of the number (m) of material-fractured expanded beads existent on the fractured surface to the number (n) of expanded beads existent on the fractured surface was calculated and defined as a degree of fusion bonding. The number (n) of expanded beads is the sum total of the number (m) of material-fractured expanded beads and the number of expanded beads exfoliated between the expanded beads.

As the m/n value increases, the degree of fusion bonding among the expanded beads becomes higher, and thus, the expanded beads molded article that is good in mechanical physical properties, such as bending strength and tensile strength, is provided. In the case where even when bending the molded article, the molded article could not be fractured, the degree of fusion bonding was defined as 100%.

(7) Tensile strength:

Tensile Test (Tensile Maximum Point Load)

As for the measurement method of the tensile strength, the tensile strength was determined by using a 10 mm-thick sample of a dumbbell No. 1 type shape as prescribed in JIS K6251 (2010) and performing the measurement in conformity with the measurement method of tensile elongation of JIS K6767 (1999). In this case, the sample was allowed to stand under conditions at 23° C. and a humidity of 50% for 24 hours, a tensile test was then performed at a testing rate of 500 mm/min, and a maximum point stress in the measurement was defined as the tensile strength. The aforementioned measurement was performed five times, and an arithmetic mean value of the obtained values was adopted.

Production of Resin Beads

To 100 parts by mass of a TPU raw material resin of a commercial grade, manufactured by Covestro (DP9385A, softening temperature: 140° C., MFR: 14 g/10 min [190° C., 10 kgf]), 0.10 parts by mass of talc as a cell adjusting agent was added, and the contents were melt kneaded with a twin-screw extruder having an inside diameter of 20 mm. The kneaded material was extruded into water from the extruder and then cut (underwater cutting method), thereby obtaining about 5 mg of TPU-based resin beads.

Preparation of Expanded Beads 1 kg of the above-obtained TPU-based resin beads and 3 liters of water as a dispersion medium were charged in a 5-liter pressure-resistant closed vessel equipped with a stirrer, and 0.1 parts by mass of kaolin as a dispersant and 0.004 parts by mass of a sodium alkylbenzenesulfonate as a dispersant aid were also added to 100 parts by mass of the resin beads.

The closed vessel was subjected to temperature rise to an impregnation temperature of 131° C. while stirring, and carbon dioxide as a blowing agent was fed under pressure into the closed vessel until the pressure reached 3.5 MPa, followed by keeping at an expansion temperature of 131° C. for 15 minutes.

Thereafter, a back pressure was applied with nitrogen, and the expandable resin beads having the blowing agent impregnated therein were released together with the dispersion medium under atmospheric pressure, while adjusting the pressure in the vessel in a fixed level, thereby obtaining expanded TPU-based beads having the dispersant attached to the surfaces thereof.

Production of Expanded TPU-based Beads Having Anionic Surfactant Attached Thereto To the above-obtained expanded TPU-based beads, each of surfactants 1 to 9 shown in Table 1 was attached in a coating amount (amount of active ingredient) shown in each of Tables 2 and 3 by the coating method as mentioned below. After the treatment, the expanded beads were dried in an oven at 40° C. and a humidity of 50% for 12 hours, to obtain expanded TPU-based beads having the surfactant attached thereto. The obtained expanded TPU-based beads were defined as expanded beads of each of the Examples and Comparative Examples.

Coating method: 3 kg of the expanded TPU-based beads and a surfactant solution were put in a blender, and an operation of stirring and mixing was performed for 15 minutes.

Production of Expanded Beads Molded Article

The expanded beads obtained by the aforementioned method were subjected to cracking filling in a flat plate mold; the expanded beads were secondarily expanded under heating with a water vapor of 0.20 to 0.35 MPa(G) at a molding pressure shown in each of Tables 2 and 3; the expanded beads were mutually fused with each other; the mold was then cooled with water; and after confirming that the surface pressure decreased to 0.02 MPa(G), the resultant was taken out from the mold to obtain an expanded beads molded article.

The molding conditions, the results of evaluations by the aforementioned methods regarding the obtained expanded beads molded articles, and so on are shown altogether in Table 2 regarding the Examples and Table 3 regarding the Comparative Examples, respectively.

Examples 1 to 3 and Comparative Examples 1 to 3

In the molded articles made of expanded beads in which the surfactant 1 of Table 1 was used as the surfactant and coated in a coating amount of 0.25 parts by mass (Example 1), 0.025 parts by mass (Example 2), and 1.0 part by mass (Example 3), respectively based on 100 parts by mass of the expanded beads, the attachment amount of the surfactant was 271 mg/m$^2$ in Example 1, 83 mg/m$^2$ in Example 2, and 776 mg/m$^2$ in Example 3, respectively, all of which values were a value reflective of the coating amount. The measurement of the attachment amount of the surfactant was performed by the method described in the specification.

On the other hand, the surfactant treatment was not performed in Comparative Example 1, and the expanded beads were washed with water in Comparative Example 2. In addition, in Comparative Example 3, the expanded beads were washed with a 5% aqueous solution of the surfactant 1 and then washed with a large amount of water.

TABLE 1

| Kind | Surfactant 1 | Surfactant 2 | Surfactant 3 | Surfactant 4 | Surfactant 5 |
|---|---|---|---|---|---|
| Trade name | Aqualic DS40S | Aqualic DL522 | Neogen S-20F | Latemul PS | Catiogen ES-OW |
| Manufacturer | Nippon Shokubai Co., Ltd. | Nippon Shokubai Co., Ltd. | Dai-ichi Kogyo Seiyaku Co., Ltd. | Kao Corporation | Dai-ichi Kogyo Seiyaku Co., Ltd. |
| Structure | Sodium polyacrylate | Sodium polyacrylate | Sodium dodecylbenzene-sulfonate | Sodium alkane-sulfonate | Octyl dimethyl ethyl ammonium ethyl sulfate |
| Classification | Anionic | Anionic | Anionic | Anionic | Cationic |
| Active ingredient (%) | 44 | 30 | 20 | 40 | 50 |
| Molecular weight | 3500 | 170000 | 348 | 315 | 310 |
| Solubility in water | Water-soluble | Water-soluble | Water-soluble | Water-soluble | Water-soluble |

| Kind | Surfactant 6 | Surfactant 7 | Surfactant 8 | Surfactant 9 |
|---|---|---|---|---|
| Trade name | Amiet 105 | Plysurf A219B | Sunrose FT-3 | Aqualic HL415 |
| Manufacturer | Kao Corporation | Dai-ichi Kogyo Seiyaku Co., Ltd. | Nippon Paper Industries Co., Ltd. | Nippon Shokubai Co., Ltd. |
| Structure | Polyoxyethylene laurylamine | Polyoxyethylene lauryl ether phosphate | Carboxymethyl cellulose | Polyacrylic acid |
| Classification | Nonionic | Anionic | Anionic | Nonionic |
| Active ingredient (%) | 100 | 99 | 100 | 45 |
| Molecular weight | 535 | 1200 | 60000 | 10000 |
| Solubility in water | Water-soluble | Water-insoluble | Water-insoluble | Water-soluble |

In these Comparative Examples, all of the attachment amounts as the surfactant by the TOC analyzer were calculated to be 45 mg/m$^2$. It may be considered that this was caused due to an influence of a low-molecular weight material generated through hydrolysis of the expanded polyurethane-based beads, or the like. In consequence, though it may be considered that the attachment amount in each of the Comparative Examples is possibly one other than that of the surfactant, the value obtained by the measurement is written as it is. In all of Comparative Examples 1 to 3, the tensile strength was 0.9 MPa or less.

When the addition amount of the dispersant determined by the aforementioned measurement method is shown, in Example 1, it was 171 ppm regarding the expanded beads and 59 ppm regarding the molded article, respectively. On the other hand, the attachment amount of the dispersant in Comparative Example 1, in which the anionic surfactant was not coated was 203 ppm regarding the expanded beads and 203 ppm regarding the molded article, respectively.

Examples 4 and 5

Using the same surfactant 1 as in Example 1, the molding pressure was set to 0.20 MPa (G) (Example 4) and 0.35 MPa (G) (Example 5), respectively, thereby obtaining molded articles having a different molded article density from each other.

Examples 6 to 8

In Example 6, the surfactant 2 having a molecular weight of 170,000, which is the same system as the surfactant 1 of Table 1, was used as the surfactant.

In addition, by using the surfactant 3 (Example 7) and the surfactant 4 (Example 8) having a different structure from each other, the expanded beads were subjected to the surfactant treatment, thereby obtaining molded articles, respectively. Expanded molded articles were obtained by using the resulting expanded beads, respectively.

Comparative Example 4

Expanded TPU-based beads obtained by using tribasic calcium phosphate as the dispersant were subjected to an acid washing treatment with nitric acid. An expanded molded article was obtained by using the resulting expanded TPU-based beads. Though the obtained tensile strength was a high value as 1.6 MPa, the surface of the molded article was yellowed and poor in the appearance. The attachment amount of the dispersant was 200 ppm regarding the expanded beads before washing and 30 ppm regarding the expanded beads after washing, respectively.

Comparative Examples 5 to 6

By using, as the surfactant, the cationic surfactant 5 (Comparative Example 5) and the nonionic surfactant 6 (Comparative Example 6) as shown in Table 1, the expanded beads were subjected to the surfactant treatment, thereby obtaining molded articles, respectively. Expanded molded articles were obtained by using the resulting expanded beads, respectively. In all of the obtained molded articles, the tensile strength was low.

Comparative Examples 7 to 8

By using, as the surfactant, the surfactant 7 (Comparative Example 7) and the surfactant 8 (Comparative Example 8) as shown in Table 1, all of which are anionic and water-insoluble, the expanded beads were subjected to the surfactant treatment, thereby obtaining molded articles, respectively. Expanded molded articles were obtained by using the resulting expanded beads, respectively. In all of the obtained molded articles, the tensile strength was low.

Comparative Example 9

By using, as the surfactant, the nonionic surfactant 9 which is composed mainly of only polyacrylic acid but not the polyacrylic acid salt, the expanded beads were subjected to the surfactant treatment, thereby obtaining a molded article. An expanded molded article was obtained by using the resulting expanded beads.

In the obtained molded article, the tensile strength was low as 0.3 MPa.

TABLE 2

| | | | Unit | Example 1 | Example 2 | Example 3 | Example 4 |
|---|---|---|---|---|---|---|---|
| TPU raw material | Kind | | — | 9385A | 9385A | 9385A | 9385A |
| | Classification | | — | Ether-based | Ether-based | Ether-based | Ether-based |
| | Softening temperature | | °C. | 140 | 140 | 140 | 140 |
| Expanded beads | Dispersant | Kind | — | Kaolin | Kaolin | Kaolin | Kaolin |
| | | Addition amount | G | 0.1 | 0.1 | 0.1 | 0.1 |
| | Physical properties | Apparent density | g/cm$^3$ | 0.16 | 0.16 | 0.16 | 0.16 |
| Fusion bonding properties improving treatment | Washing | Washing liquid | — | No | No | No | No |
| | Surfactant | Kind | — | Surfactant 1 | Surfactant 1 | Surfactant 1 | Surfactant 1 |
| | | Solubility in water | — | Water-soluble | Water-soluble | Water-soluble | Water-soluble |
| | | Coating amount (amount of active ingredient) | phr | 0.25 | 0.025 | 1.0 | 0.25 |
| | | Attachment amount | mg/m$^2$ | 271 | 83 | 776 | 216 |
| Molded article | Molding pressure | | MPa(G) | 0.28 | 0.28 | 0.28 | 0.20 |
| | Physical properties | Density of molded article | g/cm$^3$ | 0.21 | 0.21 | 0.21 | 0.17 |
| | | Degree of fusion bonding | % | 100 | 100 | 100 | 100 |
| | | Tensile strength | MPa | 1.4 | 1.5 | 1.4 | 1.1 |
| | Appearance | | — | Good | Good | Good | Good |

TABLE 2-continued

|  |  |  | Unit | Example 5 | Example 6 | Example 7 | Example 8 |
|---|---|---|---|---|---|---|---|
| TPU raw material | Kind | | — | 9385A | 9385A | 9385A | 9385A |
| | Classification | | — | Ether-based | Ether-based | Ether-based | Ether-based |
| | Softening temperature | | °C. | 140 | 140 | 140 | 140 |
| Expanded beads | Dispersant | Kind | — | Kaolin | Kaolin | Kaolin | Kaolin |
| | | Addition amount | G | 0.1 | 0.1 | 0.1 | 0.1 |
| | Physical properties | Apparent density | g/cm$^3$ | 0.16 | 0.16 | 0.16 | 0.16 |
| Fusion bonding properties improving treatment | Washing | Washing liquid | — | No | No | No | No |
| | Surfactant | Kind | — | Surfactant 1 | Surfactant 2 | Surfactant 3 | Surfactant 4 |
| | | Solubility in water | — | Water-soluble | Water-soluble | Water-soluble | Water-soluble |
| | | Coating amount (amount of active ingredient) | phr | 0.25 | 0.25 | 0.25 | 0.25 |
| | | Attachment amount | mg/m$^2$ | 291 | 256 | 264 | 267 |
| Molded article | Molding pressure | | MPa(G) | 0.35 | 0.28 | 0.28 | 0.28 |
| | Physical properties | Density of molded article | g/cm$^3$ | 0.27 | 0.21 | 0.21 | 0.21 |
| | | Degree of fusion bonding | % | 100 | 100 | 100 | 100 |
| | | Tensile strength | MPa | 2.7 | 1.3 | 1.4 | 1.1 |
| | Appearance | | — | Good | Good | Good | Good |

As is noted from the evaluation results shown in Table 2, all of the molded articles using the expanded beads of Examples 1 to 8 have a high tensile strength, and the characteristics of thermoplastic polyurethane-based expanded body can be revealed.

TABLE 3

| | | | Comparative Example | | | | |
|---|---|---|---|---|---|---|---|
| | | Unit | Comparative Example 1 | Comparative Example 2 | Comparative Example 3 | Comparative Example 4 | Comparative Example 5 |
| TPU raw material | Kind | — | 9385A | 9385A | 9385A | 9385A | 9385A |
| | Classification | — | Ether-based | Ether-based | Ether-based | Ether-based | Ether-based |
| | Softening temperature | ° C. | 140 | 140 | 140 | 140 | 140 |
| Expanded beads | Dispersant Kind | — | Kaolin | Kaolin | Kaolin | Tribasic calcium phosphate | Kaolin |
| | Addition amount | g | 0.1 | 0.1 | 0.1 | 0.2 | 0.1 |
| | Physical properties Apparent density | g/cm³ | 0.16 | 0.16 | 0.16 | 0.16 | 0.16 |
| Fusion bonding properties improving treatment | Washing Washing liquid | — | No | Water | No | Nitric acid | No |
| | Surfactant Kind | — | No | No | Surfactant 1 | No | Surfactant 5 |
| | Solubility in water | — | — | — | Water-soluble | — | Water-soluble |
| | Coating amount (amount of active ingredient) | phr | — | — | Concentration: 5% *1 | — | 0.25 |
| | Attachment amount | mg/m² | 45 | 45 | 45 | 45 | 111 |
| Molded article | Molding pressure | MPa(G) | 0.28 | 0.28 | 0.28 | 0.28 | 0.28 |
| | Physical properties Density of molded article | g/cm³ | 0.21 | 0.21 | 0.21 | 0.21 | 0.21 |
| | Degree of fusion bonding | % | 100 | 100 | 100 | 100 | 100 |
| | Tensile strength | MPa | 0.6 | 0.7 | 0.9 | 1.6 | 0.5 |
| | Appearance | — | Good | Good | Good | Yellowed | Good |
| | | | Comparative Example | | | | |
| | | Unit | Comparative Example 6 | Comparative Example 7 | Comparative Example 8 | Comparative Example 9 | |
| TPU raw material | Kind | — | 9385A | 9385A | 9385A | 9385A | |
| | Classification | — | Ether-based | Ether-based | Ether-based | Ether-based | |
| | Softening temperature | ° C. | 140 | 140 | 140 | 140 | |
| Expanded beads | Dispersant Kind | — | Kaolin | Kaolin | Kaolin | Kaolin | |
| | Addition amount | g | 0.1 | 0.1 | 0.1 | 0.1 | |
| | Physical properties Apparent density | g/cm³ | 0.16 | 0.16 | 0.16 | 0.16 | |
| Fusion bonding properties improving treatment | Washing Washing liquid | — | No | No | No | No | |
| | Surfactant Kind | — | Surfactant 6 | Surfactant 7 | Surfactant 8 | Surfactant 9 | |
| | Solubility in water | — | Water-soluble | Water-insoluble | Water-insoluble | Water-soluble | |
| | Coating amount (amount of active ingredient) | phr | 0.25 | 0.25 | 0.25 | 0.25 | |
| | Attachment amount | mg/m² | 78 | 164 | 224 | 248 | |
| Molded article | Molding pressure | MPa(G) | 0.28 | 0.28 | 0.28 | 0.28 | |
| | Physical properties Density of molded article | g/cm³ | 0.21 | 0.21 | 0.21 | 0.21 | |
| | Degree of fusion bonding | % | 100 | 100 | 100 | 100 | |
| | Tensile strength | MPa | 0.5 | 0.4 | 0.8 | 0.3 | |
| | Appearance | — | Good | Good | Good | Good | |

*1: After washing with the surfactant having a concentration of 5%, the resulting expanded beads were washed with a large amount of water and dried, followed by performing molding.

On the other hand, as shown in Table 3, the molded articles of Comparative Examples 1 to 3 and 5 to 9 were low in the tensile strength. In addition, in Comparative Example 4 in which the acid washing with nitric acid was performed, though the obtained tensile strength was a high value as 1.6 MPa, the surface of the molded article was yellowed and poor in the appearance.

The expanded beads of thermoplastic polyurethane of the present invention are able to improve the fusion bonding properties among the expanded beads in a molded article, and as a result, they can be utilized for production of an expanded molded article having improved tensile strength.

In addition, the method for producing an expanded thermoplastic polyurethane beads molded article of the present invention can be effectively utilized as a production method which does not use an acid component or a large amount of water for washing for the purpose of removing the dispersant and is able to minimize an environmental load.

The invention claimed is:

1. A method for producing an expanded thermoplastic polyurethane beads molded article, comprising filling expanded beads of thermoplastic polyurethane in a mold for molding and heating with a water vapor to mutually fuse the expanded beads with each other, wherein
    the expanded beads of thermoplastic polyurethane are ones obtained by attaching a water-soluble anionic surfactant in a range of from 50 mg/m² to 1,000 mg/m² onto the surfaces of expanded beads of thermoplastic polyurethane having a dispersant attached thereto,
    wherein a tensile strength of the expanded thermoplastic polyurethane beads molded article is 1.0 MPa or more.

2. The method for producing an expanded thermoplastic polyurethane beads molded article according to claim 1, wherein the thermoplastic polyurethane that constitutes the expanded beads of thermoplastic polyurethane is an ether-based thermoplastic polyurethane.

3. An expanded thermoplastic polyurethane beads molded article obtained by the method for producing an expanded thermoplastic polyurethane beads molded article according to claim 1.

* * * * *